(12) United States Patent
Waller et al.

(10) Patent No.: US 6,633,619 B1
(45) Date of Patent: Oct. 14, 2003

(54) DATA SYMBOL COUNTING DEVICE, SYNCHRONIZING DEVICE AND METHOD

(75) Inventors: Arthur Simon Waller, Basingstoke (GB); Antony David Shaw, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/407,732

(22) Filed: Sep. 28, 1999

(30) Foreign Application Priority Data

Sep. 30, 1998  (GB) ............................................. 9821188

(51) Int. Cl.[7] .............................................. H04L 7/00
(52) U.S. Cl. ....................................... 375/354; 375/357
(58) Field of Search ................................ 375/354, 357, 375/286, 240.26; 370/335, 342, 527; 348/513, 845.2

(56) References Cited

U.S. PATENT DOCUMENTS 5,987,070 A  * 11/1999  Fimoff et al. ................ 375/286
6,055,021 A  *  4/2000  Twitchell ..................... 348/513
6,243,369 B1 *  6/2001  Grimwood et al. .......... 370/335

FOREIGN PATENT DOCUMENTS

WO  WO 95/34991  12/1995

* cited by examiner

Primary Examiner—Stephen Chin
Assistant Examiner—Curtis Odom
(74) Attorney, Agent, or Firm—Frommer Lawrence & Haug LLP; William S. Frommer

(57) ABSTRACT

A method and device for counting the number of consecutive data symbols in a stream of data bytes, the device comprising a main counter for maintaining a count which is incremented/decremented for each respective consecutive data byte of said stream and adjustment means for incrementing/decrementing the count of the main counter, after every occurrence of a predetermined number of consecutive data bytes, by an adjustment value determined according to the ratio of the number of bits in the bytes to the number of bits in the symbols, such that the count represents a count of data symbols and a method and device for generating a synchronization signal from a received MPEG data stream with a MAC message containing an Upstream Slot Marker Pointer, the device including the above counting device, a controller for starting main counter according to a received MPEG synchronization signal and synchronization means for generating the synchronization signal once the main counter has counted the number of symbols indicated by the Upstream Slot Marker Pointer.

15 Claims, 2 Drawing Sheets

DATA SYMBOL COUNTING DEVICE, SYNCHRONIZING DEVICE AND METHOD

FIELD OF THE INVENTION

The present invention relates to a data symbol counting device, synchronizing device and method. More particularly, it relates to a flexible means of counting consecutive data symbols, for instance to allow synchronization with an external device on the basis of the number of received symbols.

DESCRIPTION OF THE RELATED ART

It has been proposed to allow two-way communication of information over a cable or satellite network. In such a system, it is necessary for the end users to be synchronized with the rest of the network. In this respect, the Media Access Control (MAC) layer of the protocol between the head end service provider and the end user terminals may be used to indicate synchronization information to all of the end users. In particular, as part of a MAC message, an Upstream Slot Marker Pointer may be used to indicate the start of a 3 ms marker. The three millisecond marker indicates the start of a three millisecond period for upstream transmission to the head end service provider and the Upstream Slot Marker Pointer indicates the number of downstream data symbols to be counted from the start of the next MPEG packet to the start of the three millisecond marker.

OBJECTS OF THE INVENTION

Unfortunately, current tuner technology does not directly provide symbols as an output to the rest of an end user terminal. Instead, tuners reformat received data into bytes with an associated clock-signal, which cycles only once every 8 data bits. Since, as described above, the synchronization information in the MAC message relates to a count of the number of symbol clocks, there is no direct way for an end user to synchronize with the received signal. In particular, there is no direct way of counting symbol clocks from the available byte clock that is output by the tuner.

The use of software to correct between the byte clock and the symbol clock is not feasible due to the time critical nature of the correction. In particular, if the MAC supplies only a small count value, i.e. a small number of symbols to count, a processor may not be able to respond to the event within sufficient time. It is also difficult to determine how much time elapses before the processor is able to modify a counter value, which will therefore affect the amount of correction applied.

The use of phase-locked loops might be considered. However, phase-locked loops are not cheap and the design techniques for reliable operation are not trivial.

SUMMARY OF THE INVENTION

According to the present invention, there is provided a method of counting the number of consecutive data symbols in a stream of data bytes, the method comprising:
maintaining a count which is incremented/decremented for each respective consecutive data byte of said stream; and
after every occurrence of a predetermined number of consecutive data bytes, incrementing/decrementing the count by an adjustment value determined according to the ratio of the number of bits in the bytes to the number of bits in the symbols, such that the count represents a count of data symbols.

According to the present invention, there is also provided a device for counting the number of consecutive data symbols in a stream of data bytes, the device comprising:
a main counter for maintaining a count which is incremented/decremented for each respective consecutive data byte of said stream; and
adjustment means for incrementing/decrementing the count of the main counter, after every occurrence of a predetermined number of consecutive data bytes, by an adjustment value determined according to the ratio of the number of bits in the bytes to the number of bits in the symbols, such that the count represents a count of data symbols.

In this way, it is not necessary for a device to include the additional circuitry required to produce a symbol count. The device may use a standard byte count to synchronize with received symbols. Indeed, it is therefore not necessary for a device to be manufactured specifically for a particular-type of data modulation.

The present invention also provides a device for generating a synchronization signal from a received MPEG data stream with a MAC message containing an Upstream Slot Marker Pointer, the device including:
a device as defined above;
a controller for starting said main counter according to a received MPEG synchronization signal; and
synchronization means for generating the synchronization signal once the main counter has counted the number of symbols indicated by the Upstream Slot Marker Pointer.

There is also provided a corresponding method.

In this way, it is not necessary to provide additional complicated hardware to count data symbols. A standard receiver/tuner may be used and synchronization achieved by means of its output byte clock.

Preferably, latches are provided for the predetermined number and the adjustment value.

In this way, the device may easily be set according to the particular modulation scheme with which it is intended to be used.

Preferably, the adjustment means includes an adjustment counter for respectively counting the predetermined number of consecutive data bytes.

In this way, the adjustment counter may be loaded with a value from its latch and then count down for each byte clock. Upon reaching zero, the adjustment counter may be reset to the number of the latch and the value in the main counter modified according to the adjustment value.

Preferably, the device may be implemented in an erasable programmable logic device.

In this way, the various numbers and values may be easily set according to the modulation scheme under which the device is intended to be used.

BRIEF DESCRIPTION OF THE DRAWINGS

FIG. 2 illustrates the MPEG-2 TS format.

DETAILED DESCRIPTION OF THE PREFERRED EMBODIMENTS

Figure 1:
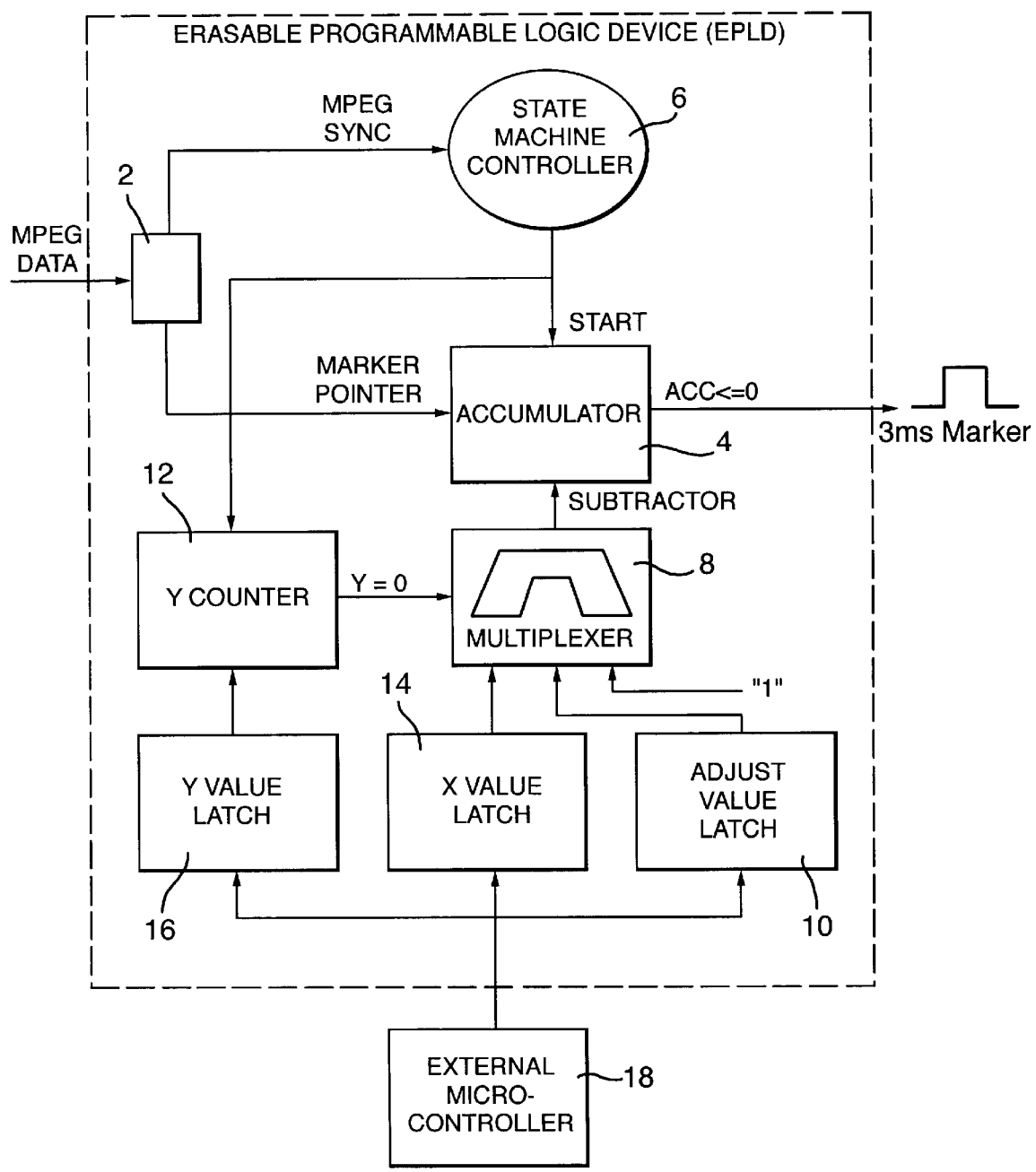
FIG. 1 illustrates a device according to the present invention.

The invention will be more clearly understood from the following description, given by way of example only, with reference to the accompanying drawings.

In recent years there has been a move towards taking advantage of technological developments to provide an interaction channel with TV services. The onset of digital cable and satellite TV makes high data rate interactive services a possibility, opening the path for high-speed internet, telephony, home shopping, etc.

Digital TV services may be encoded into a data stream with a standard specified by the Motion Picture Experts Group (MPEG), reference ISO 13818. This stream may include multiple program channels and related information. It is proposed that the interactive system consists of a Forward Interaction path (downstream) and a Return Interaction path (upstream). With the downstream data, known as "In-Band", the control and interactive data are interleaved with the MPEG program material. The upstream interaction channel may utilize one of up to eight lower bandwidth paths per downstream channel.

It is proposed that allocation of available upstream bandwidth be by Time Division Multiple Access (TDMA), whereby the bandwidth is divided into a number of fixed length slots. It is also proposed that the Media Access Control (MAC) layer of the protocol between the head end service provider and the user terminal be used to define which users are allocated bandwidth, on which frequencies and in which slot positions. Importantly, it is proposed that the MAC layer provide synchronization information to all of the end users. Accurate generation of this synchronization in the user's equipment is required in order to ensure reliable service throughout the system.

In order to take advantage of the high data rates offered by the new standards, it is necessary to implement an efficient MAC layer, which can handle the synchronization aspects of the upstream transmission. The main timing reference provided by the downstream channel, to which all upstream transmissions are synchronized, is known as the three millisecond marker. This marker indicates the start of a three millisecond period-for upstream transmission. Each three millisecond period is then further divided into slots for upstream transmission, the number of which vary according to the data rate. The slots have an associated number which increments cyclically up to a maximum defined by the system, but which typically extends to many three millisecond timing periods.

The three millisecond marker is encoded into the downstream path as part of a MAC message. In particular, the MAC message includes a code indicating the number of downstream data symbols to count from the start of the next MPEG packet to the start of the three millisecond marker. This is known as the Upstream Slot Marker Pointer and is shown in the MPEG frame structure illustrated in FIG. 2.

The downstream data is typically modulated onto a radio frequency (RF) carrier in order to transmit the information over a cable or a satellite network. Typical modulation schemes include Quaternary Phase Shift Keying (QPSK) and Quadrature Amplitude Modulation (QAM), whereby a number of data bits are encoded as a group (a symbol) onto the carrier. The number of bits per symbol varies according to the encoding scheme used. For example, QPSK provides 2 bits per symbol (4 symbols per byte) and QAM provides 4 bits per symbol (16-QAM), 5 bits per symbol (32-QAM), 6 bits per symbol (64-QAM) etc.

As explained above, the Upstream Slot Marker Pointer is defined as being the number of symbols from the start of the -next MPEG packet to the start of the three millisecond marker. However, current tuner technology does not directly provide the data symbols as an output. Instead, tuners reformat the data into bytes with an associated clock signal, which cycles only once every 8 data bits. Since the information in the MAC message for synchronization is for a count of the number of symbol clocks, there is no direct way of counting symbol clocks from the available byte clock that is output by the tuner. It is only contemplation of interactive services such as discussed above that has generated the need for the symbol count to be considered.

The present invention is based on counting byte clocks from the MPEG transport stream as though they were symbol clocks and then applying a correction factor whenever the data symbols are in a particular relationship, for instance aligned, to a byte interval. According to an embodiment to be described below, this is achieved by loading an accumulator with the Marker Pointer value, decrementing this value by 1 at every byte clock and applying the correction factor where necessary until the value reaches zero. At this point, it is judged that the three millisecond marker has been reached.

This process ensures that the count follows the symbol count as closely as possible with minimum error. As an example, a QAM-64 demodulated signal contains 6 bits of data per symbol such that 4 symbols constitute 3 bytes. In this case, the accumulator is normally decremented by 1 for every byte clock, but is decremented by 2 for every third byte clock in order to correctly track the symbol count. In this way, there can never be more than one symbol's worth of error in the count, ensuring that the three millisecond marker reference is always generated at least very close to the correct position and that no collision of transmitted data will occur with other users.

The table below lists the typical modulation schemes adopted for networks such as for the DVB, together with the relationship between byte clocks and symbol clocks and the maximum symbol error that will occur in each case as a result of using this scheme.

| Modification | Byte Clock/ Symbol clock | X Value | Y Value | Error (in system clocks) |
| --- | --- | --- | --- | --- |
| QAM 256 | 1/1 | 1 | 0 | 0 |
| QAM64 | 3/4 | 2 | 2 | $\leq 1$ |
| QAM32 | 5/8 | 4 | 4 | $\leq 3$ |
| QAM16 | ½ | 2 | 0 | $\leq 1$ |
| QPSK | 1/4 | 4 | 0 | $\leq 3$ |

It will be noted that the worst error which can occur for any of these systems is a 3 symbol error. In this respect, the downstream data transmission rates is typically 27.5 M symbols/s whereas the upstream transmission rate might only be 3M bits/s. Thus, an error of 3 symbol clocks will be less than 1 bit in terms of upstream transmission. This is clearly always well within the upstream 1 byte guard band tolerance: that is allowed by the specification (ETS 300 800). "Digital Video Broadcasting (DVB); DVB Interaction Channel for Cable TV Distribution Systems (CATV)". Aug. 12, 1997).

Referring to FIG. 1, there is shown a device for providing a three millisecond marker as described above and including a symbol counter embodying the present invention.

The state machine controller 6 awaits the next MPEG synchronization and then indicates that the modification to the count in the accumulator 4 should begin. As will be described below, at each byte clock, the value of the count in the accumulator 4 is then modified or adjusted by a subtracter 8 in the manner described above. Once the count value equals zero, the device then outputs a signal indicating the three millisecond marker.

According to this preferred embodiment, there is also an initial stage of correction in which the accumulator value is modified by a time off-set value provided by the adjust value latch 10.

The adjust value latch 10 is set with a value to compensate for network delays such as the different propagation times that will occur between various users and the head end, due to variations in cable or path length etc. In particular, when the users equipment is switched on, a value to compensate for the various delays is determined by the system through a procedure known as sign-on and calibration. This value is stored in the adjust value latch 10 and is then used to modify each subsequent generation of the three millisecond marker. This is important to ensure that data arrives at the head end in the correct time slot and aligned with the set tolerances.

Having made the initial correction, at each byte clock, the value in the accumulator 4 is then reduced by 1 by the subtracter 10.

As illustrated, an adjustment counter 12 is provided. Like the accumulator, this is provided with the start signal from the state machine controller 6 and also counts down at every byte clock. However, it is preloaded with a Y value according to the type of modulation used by the received signal and repeatedly counts down from the Y value to zero.

Various Y values are indicated in the table above for different modulation schemes.

The Y value signifies a predetermined number of consecutive data bytes which, in this example, corresponds to the number of bytes required to align the received symbols to byte boundaries.

When the adjustment or Y counter reaches 0 it indicates some predetermined periodic relationship between the byte clock and the symbol clack, in this example, alignment. At this point, the Y counter is reset and the subtracter 10, which is used normally to decrement the accumulator 4 by 1, decrements the accumulator 4 by a predetermined adjustment value, as discussed above.

Various adjustment values are used for various modulation schemes and are indicated as X values in the table above. According to the definition of the Y value given above, where the Y value is itself 0, then on every byte count, the X value is used for the subtraction.

As illustrated, an X value latch 14 and a Y value latch 16 are preferably provided to store appropriate X and Y values according to the modulation type of the received data stream.

When the value in the accumulator 4 become less than or equal to 0, the three millisecond marker is output. At this time, the device can await the reloading of a slot marker pointer in the accumulator 4 and the following MPEG synchronization signal.

The table below provides a work-through of the process for the QAM-64 example, with a pre-loaded Marker Pointer of 16.

| Byte Number | Y Count | Corrected Byte Count (Symbol Count) |
|---|---|---|
| 0 | 2 | 16 |
| 1 | 1 | 15 |
| 2 | 0 | 13 |
| 3 | 2 | 12 |
| 4 | 1 | 11 |
| 5 | 0 | 9 |
| 6 | 2 | 8 |
| 7 | 1 | 7 |
| 8 | 0 | 5 |
| 9 | 2 | 4 |
| 10 | 1 | 3 |
| 11 | 0 | 1 |
| 12 | 2 | 0 |

Thus, in summary, the state machine controller 6 monitors the MPEG data stream firstly for the upstream slot marker pointer, which presets the accumulator 4, and then the next MPEG sync which starts the subtraction processor. The device is idle after issuing the three millisecond marker whilst while waiting for the arrival of the next pointer. The output three millisecond signal is used to invoke the counting of slot positions within the three millisecond period, performed in conjunction with the MAC control microprocessor in the user's equipment.

The device may be implemented in an erasable programmable logic device (EPLD) so as to allow a degree of flexibility to be incorporated. For example, the time off-set value of the adjust value latch 10, the Y value and the X value may be programmed by an external microcontroller 18. In this way, the erasable programmable logic device may be used in any application, irrespective of the modulation system used for the received MPEG data. The external microcontroller can merely supply the device with the appropriate values for the particular system.

The technique of correcting an accumulated byte count to emulate a symbol count in producing the upstream synchronization information, allows a cheap solution for the interaction channel of a DVB compliant service.

The simplicity of the solution makes it ideal for consumer equipment, such as variable data rate cable modems and Network Interface Units. Here, the generation of synchronization information must be made in the user's equipment, and must be accurate and within timing tolerances in order to avoid collision with other user's data, thereby maintaining a reliable service. The solution permits the use of existing downstream tuners and demodulators (both QAM and QPSK) without modification, thus avoiding the cost penalties associated with product redesign for new markets.

Although the particular device described above sets particular values in th e accumulator/counter and then decrements these values to 0, it is also possible for a device to be constructed where the accumulator/counter counts up to preset values. Similarly, in certain circumstances, for instance where a symbol includes more bits than the 8 bits of a byte, the accumulator might normally be decremented, but incremented for correction or normally incremented and decremented for correction.

We claim:

1. A device for counting the number of consecutive data symbols in a stream of data bytes, the device comprising:
    a main counter for maintaining a count which is incremented/decremented for each respective consecutive data byte of said stream; and
    adjustment means for incrementing/decrementing the count of the main counter, after every occurrence of a predetermined number of consecutive data bytes, by an adjustment value determined according to the ratio of the number of bits in the bytes to the number of bits in the symbols, such that the count represents a count of data symbols.

2. A device according to claim 1 for use with a stream of data bytes in which the ratio of bits in the bytes to bits in the symbols is at least 1 and wherein, when the count is incremented/decremented for each respective consecutive data byte, the count is respectively incremented/decremented by said adjustment value after every occurrence of the predetermined number of consecutive data bytes.

3. A device according to claim 1 further comprising a count latch for latching a particular said predetermined number of consecutive data bytes according to the type of symbols to be counted.

4. A device according to claim 1 further comprising a value latch for latching a particular said adjustment value according to the type of symbols to be counted.

5. A device according to claim 1 wherein the adjustment means includes an adjustment counter for repetitively counting the predetermined number of consecutive data bytes.

6. A device according to claim 1 wherein, for the following types of modulated data streams, the predetermined number of consecutive bytes and adjustment value are respectively.

7. A device according to claim 1 wherein the main counter comprises an accumulator for maintaining the count and the adjustment means comprises an adder/subtracter for incrementing/decrementing said adjustment value.

8. A device for generating a synchronization signal from a received MPEG data stream with a MAC message containing an Upstream Slot Marker Pointer, the device including:

a device for counting the number of consecutive data symbols in a stream of data bytes, the device including a main counter for maintaining a count which is incremented/decremented for each respective consecutive data byte of said stream; and adjustment means for incrementing/decrementing the count of the main counter, after every occurrence of a predetermined number of consecutive data bytes, by an adjustment value determined according to the ratio of the number of bits in the bytes to the number of bits in the symbols, such that the count represents a count of data symbols;

a controller for starting said main counter according to a received MPEG synchronisation synchronization signal; and synchronization means for generating the synchronization signal once the main counter has counted the number of symbols indicated by the Upstream Slot Marker Pointer.

9. A device according to claim 8 wherein the main counter is set with the symbol number represented by the Upstream Slot Marker Pointer and is decremented for each respective consecutive data byte and wherein said synchronization means generates said synchronization signal when the value in said main counter reaches zero.

10. A device according to claim 8 wherein the synchronization signal is a three millisecond marker.

11. A device according to claim 8, further comprising an adjust value latch for storing a correction value to compensate for network delays, wherein the timing of the output from the synchronization means is modified according to the correction value.

12. A device according to claim 8 implemented in an erasable programmable logic device.

13. A device according to claim 1 implemented in an erasable programmable logic device.

14. A method of counting the number of consecutive data symbols in a stream of data bytes, the method comprising:

maintaining a count which is incremented/decremented for each respective consecutive data byte of said stream; and after every occurrence of a predetermined number of consecutive data bytes, incrementing/decrementing the count by an adjustment value determined according to the ratio of the number of bits in the bytes to the number of bits in the symbols, such that the count represents a count of data symbols.

15. A method of generating a synchronization signal from a received MPEG data stream with a MAC message containing an Upstream Slot Marker Pointer including:

a method of counting according to claim 14; starting the count according to a received MPEG synchronization signal; and generating the synchronization signal once the count has counted the number of symbols indicated by the Upstream Slot Marker Pointer.

* * * * *